United States Patent [19]

Watanabe

[11] Patent Number: 5,197,108

[45] Date of Patent: Mar. 23, 1993

[54] SMOOTHING METHOD AND APPARATUS FOR SMOOTHING CONTOUR OF CHARACTER

[75] Inventor: Sumio Watanabe, Yokohama, Japan

[73] Assignee: Ricoh Company, Ltd., Japan

[21] Appl. No.: 753,309

[22] Filed: Sep. 27, 1991

Related U.S. Application Data

[62] Division of Ser. No. 327,749, Mar. 23, 1989, Pat. No. 5,093,870.

[30] Foreign Application Priority Data

Mar. 31, 1988 [JP] Japan .................................. 63-76515

[51] Int. Cl.⁵ .......................................... G06K 9/44
[52] U.S. Cl. ..................................... 382/47; 340/731; 358/451; 382/22; 382/54
[58] Field of Search ................... 340/723, 728, 731; 382/54, 47, 22; 358/447, 451

[56] References Cited

U.S. PATENT DOCUMENTS

| | | | |
|---|---|---|---|
| 4,079,367 | 3/1978 | Yonezawa | 340/728 |
| 4,331,955 | 5/1982 | Hansen | 340/728 |
| 4,354,243 | 10/1982 | Ryan et al. | 382/54 |
| 4,638,369 | 1/1987 | Hsieh | 382/54 |
| 4,680,720 | 7/1987 | Yoshii et al. | 340/728 |
| 4,827,533 | 5/1989 | Tanaka | 382/54 |
| 4,855,934 | 8/1989 | Robinson | 382/54 |

*Primary Examiner*—Leo H. Boudreau
*Attorney, Agent, or Firm*—Mason, Fenwick & Lawrence

[57] ABSTRACT

A smoothing method and a smoothing apparatus for smoothing a contour of a dot pattern of a character extract a contour of a dot pattern of a character to be smoothened, smoothen the contour of the dot pattern, and carry out a rectilinear interpolation and a corner rounding process on a smoothened contour which is obtained after the contour is smoothened. The process of smoothing the contour includes a step of extracting corner points of the contour of the dot pattern, and a step of determining each position of curve points of each object corner point based on a direction and distance of each object corner point from other corner points before and after the object corner point for each of the extracted corner points, where the curve points constitute the smoothened contour of the character.

4 Claims, 5 Drawing Sheets

SMOOTHING METHOD AND APPARATUS FOR SMOOTHING CONTOUR OF CHARACTER

This application is a divisional of U.S. patent application Ser. No. 07/327,749, filed Mar. 23, 1989 now U.S. Pat. No. 5,093,870.

BACKGROUND OF THE INVENTION

The present invention generally relates to smoothing methods and apparatuses, and more particularly to a smoothing method and a smoothing apparatus for smoothing a contour of a dot pattern of a character which is enlarged and reduced. The present invention is suited for application in a desk top publishing system, a personal computer, a word processing system, a digital facsimile machine and the like wherein a basic character font constituted by a dot pattern is enlarged or reduced when outputted.

When reading out from a font memory a basic character font which is constituted by a dot pattern, there is often a need to enlarge or reduce the size of the basic character font. When enlarging the basic character font, each black (or white) dot of the basic character font is converted into a group of black (or white) dots of a number dependent on the magnification. For example, when enlarging a 24×24 dot pattern of a character (hereinafter referred to as a dot character pattern) with a magnification of 2 into a 48×48 dot character pattern, one dot is converted into a matrix arrangement of 2×2 (=4) dots. Similarly, when reducing the 24×24 dot character pattern with a magnification of ⅔ into a 16×16 dot character pattern, a matrix arrangement of 3×3 (=9) dots is converted into a matrix arrangement of 2×2 (=4) dots. However, when the dot character pattern is enlarged and reduced in the above described manner, the contour of the character includes gathers and is extremely deformed from the contour of the original character. As a result, the enlarged or reduced character lacks smoothness in the contour thereof, and the shape and form of the character is deformed.

As one method of preventing the unwanted deformation of the character when the character is enlarged, there is a method disclosed in a Japanese Published Patent Application No.53-24146 which makes an interpolation at a stepped corner portion of a group of dots having a matrix arrangement by adding a group of dots which are arranged in a right-angled isosceles triangular shape of an appropriate size so as to smoothen the contour of the enlarged dot character pattern. However, according to this method, an oblique line having an inclination other than 45 degrees does not become a rectilinear line after the enlargement and interpolation. For example, when an oblique line having an inclination of 3/5 is enlarged and subjected to the interpolation referred above, the oblique line after the enlargement and interpolation includes gathers and does not become a rectilinear line.

In order to prevent the oblique line from becoming gathered after the enlargement and interpolation, it is possible to conceive a method of fitting to the oblique line portion a rectilinear line which is as long as possible for the interpolation. But in this case, curves which have a large curvature all become rectilinear lines after the interpolation and there is a problem in that it is impossible to describe delicate curves of the character.

As an alternative methods, there are smoothing methods which use a spline curve or a Bézier curve, but these methods require complex processes and an extremely long time to carry out such complex processes. Furthermore, there is also a problem in that a digital coordinate representation is unsuited in the case of quadratic curves or curves of higher order.

SUMMARY OF THE INVENTION

Accordingly, it is a general object of the present invention to provide a novel and useful smoothing method and a smoothing apparatus in which the problems described above are eliminated.

Another and more specific object of the present invention is to provide a smoothing method for smoothing a contour of a dot pattern of a character comprising the steps of extracting a contour of a dot pattern of a character to be smoothened, smoothing the contour of the dot pattern, and carrying out a rectilinear interpolation and a corner rounding process on a smoothened contour which is obtained after the step of smoothing the contour. The step of smoothing the contour includes a substep of extracting corner points of the contour of the dot pattern, and a substep of determining each position of curve points of each object corner point based on a direction and distance of each object corner point from other corner points before and after the object corner point for each of the extracted corner points, where the curve points constitute the smoothened contour of the character. According to the smoothing method of the present invention, it is possible to automatically and easily smoothen the contour of an enlarged or reduced dot character pattern by use of a processing device or the like. In addition, it is possible to prevent the quality of the character from becoming deteriorated when the dot character pattern is enlarged or reduced.

Still another object of the present invention is to provide a smoothing method for smoothing a contour of a dot pattern of a character comprising the steps of extracting a contour of a dot pattern of a character to be smoothened, smoothing the contour of the dot pattern, and carrying out a rectilinear interpolation and a corner rounding process on a smoothened contour which is obtained after the step of smoothing the contour. The step of smoothing the contour includes a substep of extracting corner points of the contour of the dot pattern, a substep of determining each position of first curve points of each object corner point based on a direction and distance of each object corner point from other corner points before and after the object corner point for each of the extracted corner points, and a substep of obtaining each position vector of second curve points of each of the first curve points based on a position vector and a smoothness of the first curve points, where the second curve points constitute the smoothened contour of the character. According to the smoothing method of the present invention, it is possible to further smoothen the contour of the enlarged or reduced dot character pattern.

A further object of the present invention is to provide a smoothing apparatus for smoothing a contour of a dot pattern of a character, comprising contour extracting means for extracting a contour of a dot pattern of a character to be smoothened, smoothing means for smoothing the contour of the dot pattern extracted by the contour extracting means, processing means for carrying out a rectilinear interpolation and a corner rounding process on a smoothened contour which is obtained by the smoothing means, and control means for controlling operations of the contour extracting means, the smoothing means and the processing means. The control means controls the smoothing means to extract corner points of the contour of the dot pattern and to determine each position of curve points of each object corner point based on a direction and distance of each object corner point from other corner points before and after the object corner point for each of the extracted corner points, where the curve points constitute the smoothened contour of the character. According to the smoothing apparatus of the present invention, it is possible to automatically and easily smoothen the contour of an enlarged or reduced dot character pattern. In addition, it is possible to prevent the quality of the character from becoming deteriorated when the dot character pattern is enlarged or reduced.

Another object of the present invention is to provide a smoothing apparatus for smoothing a contour of a dot pattern of a character, comprising extracting means for extracting a contour of a dot pattern of a character to be smoothened, smoothing means for smoothing the contour of the dot pattern extracted by the extracting means, processing means for carrying out a rectilinear interpolation and a corner rounding process on a smoothened contour which is obtained by the smoothing means, and control means for controlling operations of the extracting means, the smoothing means and the processing means. The smoothing means includes a first part for extracting corner points of the contour of the dot pattern and a second part for determining each position of first curve points of each object corner point based on a direction and distance of each object corner point from other corner points before and after the object corner point for each of the extracted corner points. The control means controls the smoothing means to obtain each position vector of second curve points of each of the first curve points based on a position vector and a smoothness of the first curve points, where the second curve points constitute the smoothened contour of the character. According to the smoothing apparatus of the present invention, it is possible to further smoothen the contour of the enlarged or reduced dot character pattern.

Other objects and further features of the present invention will be apparent from the following detailed description when read in conjunction with the accompanying drawings.

DETAILED DESCRIPTION

Figure 1:
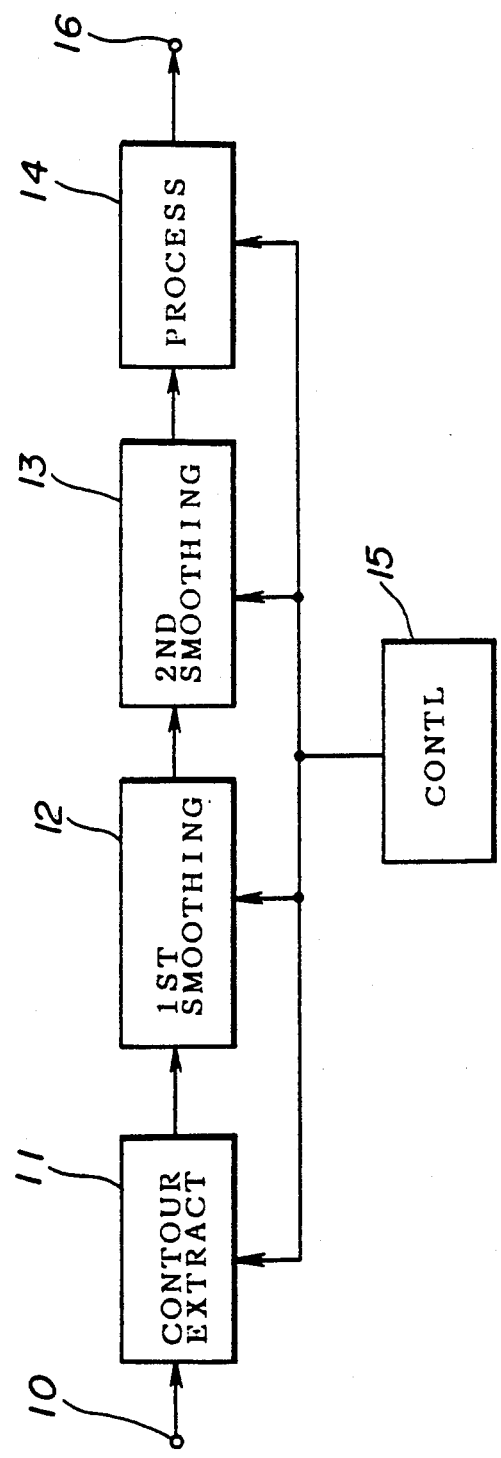
FIG.1 is a system block diagram showing an embodiment of a smoothing apparatus according to the present invention.

FIG.1 shows an embodiment of a smoothing apparatus according to the present invention. The smoothing apparatus has a contour extracting part 11, a first smoothing part 12, a second smoothing part 13, a processing part 14 and a controller 15. A dot character pattern which has been subjected to an enlarging or reducing process is supplied to the contour extracting part 11 through an input terminal 10, and a smoothened dot character pattern is outputted from the processing part 14 through an output terminal 16.

Figure 2:
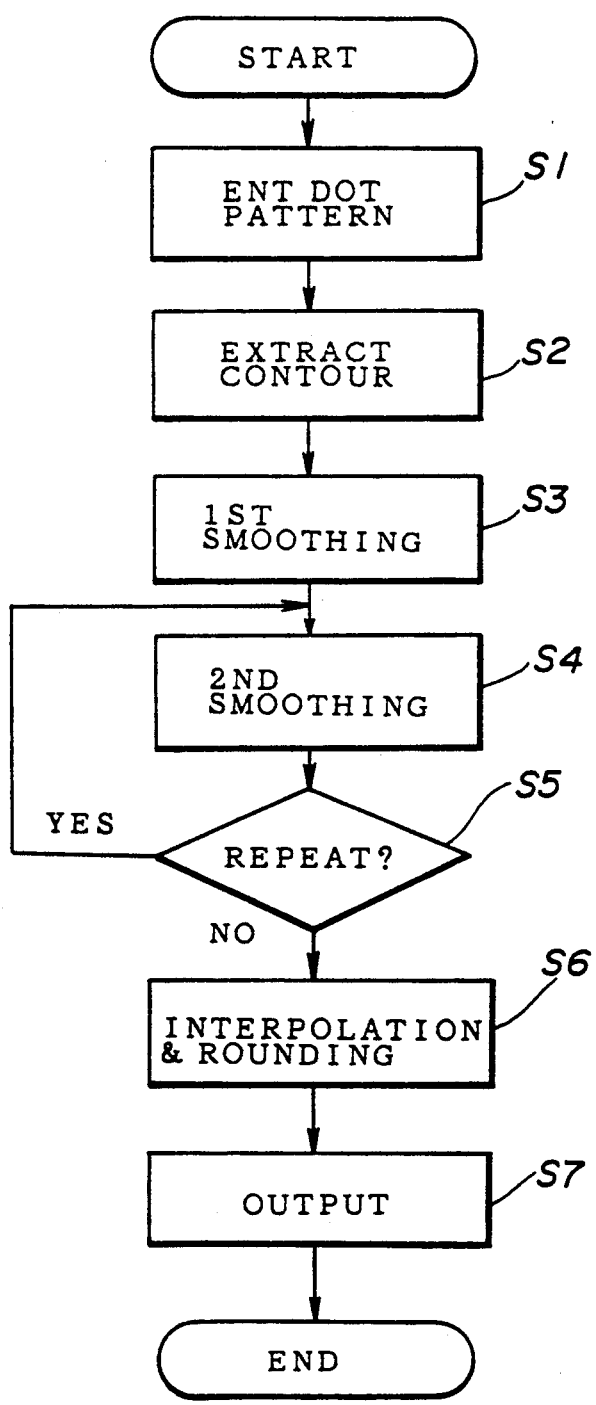
FIG.2 is a flow chart for explaining an embodiment of a smoothing method according to the present invention carried out under a control of a controller of the block system shown in FIG.1.
Figure 3:
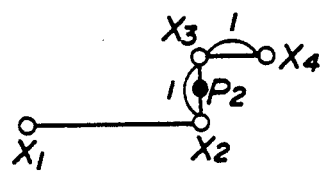
FIGS.3A through 3G are diagrams for explaining a determination of a first curve point obtained by a first smoothing process and a smoothness thereof.
Figure 3:
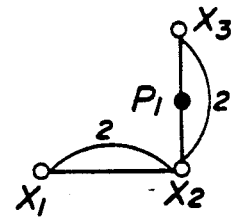
Figure 3:
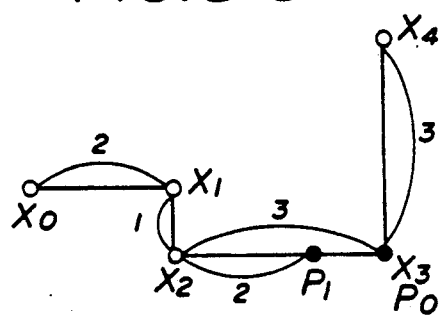
Figure 3:
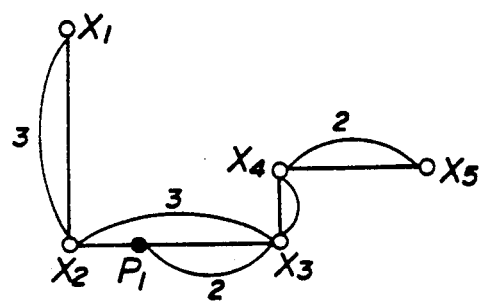
Figure 3:
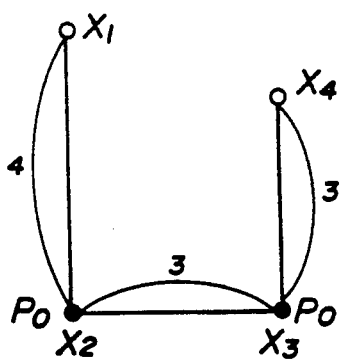
Figure 3:
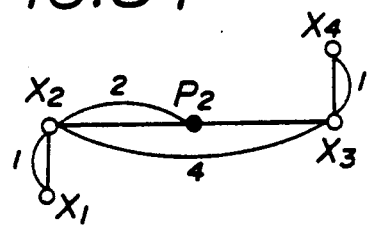
Figure 3:
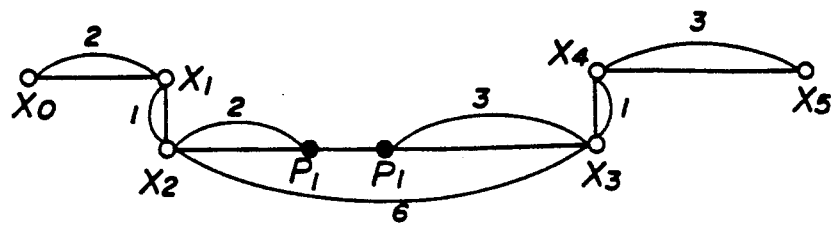

FIG.2 is a flow chart for explaining an embodiment of a smoothing method according to the present invention carried out under a control of the controller 15 shown in FIG.1. In FIG.2, a step S1 enters a dot character pattern which has already been subjected to a known enlarging or reducing process such as that described before. A step S2 controls the contour extracting part 11 to extract a contour of a character which is described by the dot character pattern by a known method, and a step S3 controls the first smoothing part 12 to carry out a first smoothing process on the extracted contour. The first smoothing process in the first smoothing part 12 uses the characteristics of the dot character pattern in smoothing the contour of the character pattern. The characteristics of the dot character pattern include relationships of lengths of contour lines intersecting each of corner points constituting the contour of the character pattern from top and bottom or right and left of the corner point. For example, a corner point position where long contour lines intersect is in most cases a corner portion of the character itself, and a corner point position where one of intersecting contour lines is short is in most cases a gather caused by the dots. Hence, the first smoothing process obtains a position and smoothness of a curve point of a corner point based on directions and distances from a plurality of corner points are located before and after the corner point, for each of the corner points.

A step S4 controls the second smoothing part 13 to carry out a second smoothing process based on a position vector $\{Xi\}$ $i=1, \ldots, N$ and the smoothness of each first curve point which is obtained by the first smoothing process, so as to obtain a position vector $\{Qm\}$ $m=1, \ldots, M$ of each new curve point. The second smoothing process uses the characteristic that the first curve points obtained by the first smoothing process have a correlation which at a time of the smoothing is stronger as a distance between the first smoothing points becomes closer. In other words, the second smoothing process obtains a position vector of each second curve point by a weighted mean.

A step S5 discriminates whether or not the step S4 is to be repeated, and the contour of the character pattern is smoothened by carrying out the step S4 one or a plurality of times depending on the discrimination result in the step S5. Then, a step S6 controls the processing part 14 to carry out a known rectilinear interpolation between the second curve points and a corner rounding process if needed. A step S7 obtains a new dot character pattern having the smoothened contour by connecting the second curve points by contour lines and outputs the new dot character pattern.

FIGS.3A through 3G are diagrams for explaining a determination of the first curve point obtained by the first smoothing process and the smoothness thereof. FIGS.3A through 3G show a case where first curve points P and smoothnesses of "0" to "2" are obtained for a corner point $X_2$ of a contour of a dot character pattern according to a direction and a distance $d_i$ from each of corner points $X_i$ (i=1, 2, ..., 5) of a contour of a dot character pattern which is to be subjected to the first smoothing process. The value of the smoothness becomes smaller as the degree of the smoothing becomes smaller.

In FIGS.3A through 3G, white circular marks indicate corner points $X_0, X_1, \ldots, X_5$ of the contour of the character pattern extracted from the dot character pattern, while black circular marks indicate the first curve points P obtained by the first smoothing process. For the purpose of simplifying the explanation, the first curve points P and the smoothnesses of "0" to "2" are obtained for the corner point $X_2$ according to a direction and a distance $d_i$ from each of six corner points $X_0$ through $X_5$ having the corner point $X_2$ in a center with reference to discriminating conditions I through VIII which will be described hereunder.

The distance $d_i$ from the corner points is calculated from a formula $d_i = |X_{i+1} + X_i|$ (i=0, 1, 2, 3, 4) by taking a distance which corresponds to one dot of the original dot character pattern as "1" regardless of whether the character pattern has been enlarged or reduced. Accordingly, in FIGS.2A through 2G, $d_0$ indicates a distance from the corner point $X_0$ to the corner point $X_1$, $d_1$ indicates a distance from the corner point $X_1$ to the corner point $X_2$, $d_2$ indicates a distance from the corner point $X_2$ to the corner point $X_3$, $d_3$ indicates a distance from the corner point $X_3$ to the corner point $X_4$, and $d_4$ indicates a distance from the corner point $X_4$ to the corner point $X_5$.

Next, a description will be given of the discriminating conditions I through VIII of the first smoothing process.

Condition I: When $d_2 = 1$ in FIG.3A, a middle point between the corner points $X_2$ and $X_3$ is set to a point $P_2$ having a smoothness "2", where the subscript "2" on P indicates the smoothness of the point.

Condition II: When $d_2 = 2$ and $d_1 = 2$ or $d_3 = 2$ in FIG.3B, a middle point between the corner points $X_2$ and $X_3$ is set to a point $P_1$ having a smoothness "1".

Condition III: Excluding the cases above and when $d_1 = 1$ and $d_3 \geq 2$ in FIG.3C, the corner point $X_3$ is set to a point $P_0$ having a smoothness of "0". When $d_0 < d_2$, a point located at a distance $d_0$ in a direction from the corner point $X_2$ to the corner point $X_3$ is also set to a point $P_1$ having the smoothness "1".

Condition IV: Excluding the cases above and when $d_1 \geq 2$ and $d_3 = 1$ in FIG.3D, the corner point $X_2$ is set to a point $P_0$ having the smoothness "0". In this state, when $d_2 > d_4$, a point located at a distance $d_4$ in a direction from the corner point $X_2$ to the corner point $X_3$ is also set to a point $P_1$ having the smoothness "1".

Condition V: Excluding the cases above and when $d_1 \geq 2$ and $d_3 \geq 2$ in FIG.3E, the corner points $X_2$ and $X_3$ are respectively set to a point $P_0$ having the smoothness "0".

Condition VI: When $d_1 = d_3 = 1$ and direction vectors $X_1 \rightarrow X_2$ and $X_3 \rightarrow X_4$ are directed to the same direction in FIG.3F, a middle point between the corner points $X_2$ and $X_3$ is set to a point $P_2$ having the smoothness "2".

Condition VII: Excluding the cases above and when $d_2 > d_0 + d_4$ in FIG.3G, a point located a distance $d_0$ in a direction from the corner point $X_2$ to the corner point $X_3$ and a point located a distance $d_4$ in a direction from the corner point $X_3$ to the corner point $X_2$ are respectively set to a point $P_1$ having the smoothness "1".

Condition VIII: Excluding the cases above and when $d_2 \leq d_0 + d_4$ in FIG.3G, a middle point between the corner points $X_2$ and $X_3$ is set to a point $P_1$ having the smoothness "1".

In FIGS.3A through 3G, the first curve points P and the smoothnesses "0" through "2" thereof are obtained only for the corner point $X_2$. However, the first curve points P and the smoothnesses "0" through "2" thereof can be obtained similarly for other corner points by applying the discriminating conditions I through VIII by taking an object corner point as a new corner point $X_2$.

Figure 4:
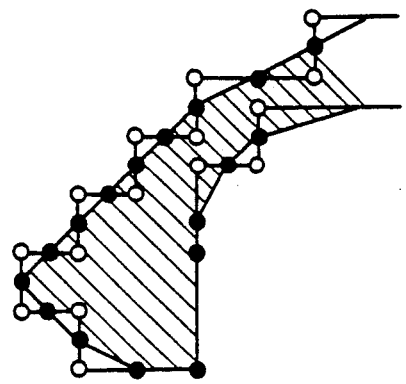
FIG.4 is a diagram for explaining a smoothing process carried out with respect to a contour of a dot character pattern which is obtained after the first smoothing process.

FIG.4 shows an upper portion of a contour of a dot character pattern "a" which is made by applying the discriminating conditions I through VIII of the first smoothing process. In other words, the first curve points are obtained by applying the conditions I through VIII to each of the points indicated by the white circular marks and constituting the corner points of the contour, and connecting the first curve points so as to obtain the smoothened character pattern indicated by the hatching.

In this embodiment, three kinds of first curve points $P_0$ through $P_2$ are determined based on the state of each of a total of six corner points which have the object corner point at the center. However, the kinds of first curve points may be increased so as to obtain a character pattern having an even finer quality by carrying out the first smoothing process. For example, five kinds of curve points respectively having the smoothnesses "0" through "4" may be determined based on the state of each of a total of sixteen corner points which have the object corner point at the center.

The second smoothing process carries out the smoothing process described hereunder on each of the first curve points $P_0$ through $P_2$ which are obtained by the first smoothing process. The second smoothing process is carried out one or a plurality of times so as to further smoothen the contour of the character pattern into a natural looking contour.

In other words, when a position vector of the first curve points $P_0$ through $P_2$ obtained by the first smoothing process is denoted by $\{X_i\}$ i=1, ..., N and a position vector of the second curve points after the second smoothing process is denoted by $\{Q_m\}$ m=1, ..., M, the position vector $Q_m$ of each of the second curve points is obtained from a following formula (1) by a weighted mean of the position vectors of the surrounding first curve points.

$$Q_m = 1^k ({}_kC_0 X_i + {}_kC_1 X_{i+1} + {}_kC_2 X_{i+2} + \ldots + {}_kC_k X_{i+k}) \quad (1)$$

Figure 5:
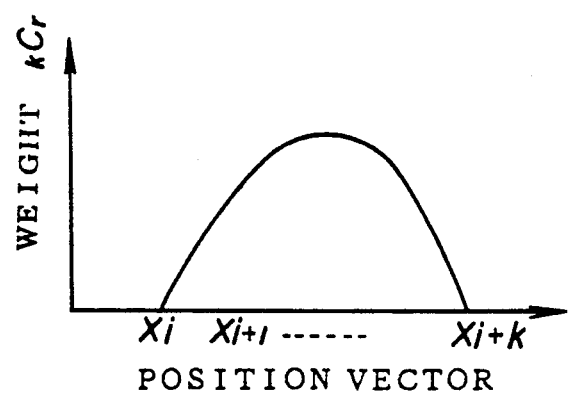
FIG.5 is a graph for explaining a weighting of a second curve point obtained by a second smoothing process.

In the formula (1) above, ${}_kC_r (= k!/(k-r)!r!)$ indicates a number of combinations for obtaining r from an arbitrary number k, and a weighting in a vicinity of a center position of the first curve points $X_i$ and $X_{i+k}$ is set to a maximum as shown in FIG.5. In the formula (1), the number k of the first curve points X selected is chosen depending on the smoothness of the object first curve point located at the center position.

The following discriminating conditions Ia through IIIa are a specific example of the second smoothing process realized by the formula (1) for the case where the position vector $Q_m$ of the second curve point is obtained depending on the smoothness "0" through "2" of each of the first curve points which are obtained by the first smoothing process. The weighting is changed depending on the smoothness "0" through "2" of the first curve points which are obtained by the first smoothing process.

Next, a description will be given of the discriminating conditions Ia through IIIa of the second smoothing process.

Condition Ia: When the first curve point $X_i$ has the smoothness "0", the first curve point $X_i$ is set to a second curve point $Q_m$ having a smoothness "0". This operation corresponds to setting $k=0$ in the formula (1).

Condition IIa: When the first curve point $X_i$ has a smoothness "1", a point given by $Q_m=(X_{i-1}+2X_i+X_{i+1})/4$ is set to a second curve point $Q_m$ having a smoothness "1". This operation corresponds to setting $k=2$ in the formula (1), setting the weights of the three first curve points to $_2C_0=1$, $_2C_1=2$ and $_2C_2=1$ and obtaining the weighted mean thereof.

Condition IIIa: When the first curve point $X_i$ has a smoothness "2" and n is incremented from $n=1$ until the smoothness of the first curve point $X_{i+n}$ or $X_{i-n}$ becomes other than "2", a point given by $$Q_m = \frac{1}{2}^{2n+1}\left(\sum_{i=-n}^{n} {}_{2n+1}C_i X_1\right)$$

is set to a second curve point $Q_m$ having a smoothness "0" when the smoothness of the first curve point $X_{i+n}$ or $X_{i-n}$ becomes other than "2". This operation corresponds to setting $k=2n+1$ in the formula (1).

Furthermore, each position vector $\{Q_m\}$ of the second curve points which are obtained by the second smoothing process carried under the discriminating conditions Ia through IIIa is replaced by a corresponding position vector $\{X_i\}$ of new first curve points, and the second smoothing process carried under the discriminating conditions Ia through IIIa is repeated a required number of times. And, the position vectors $\{Q_m\}$ of the second curve points which are obtained at a time when the second smoothing process is repeated a predetermined number of times are taken as contour points of the final dot character pattern. The character pattern having the smoothened contour can be obtained by subjecting the contour points to a known rectilinear interpolation and a corner rounding process and connecting the contour lines.

Figure 6:
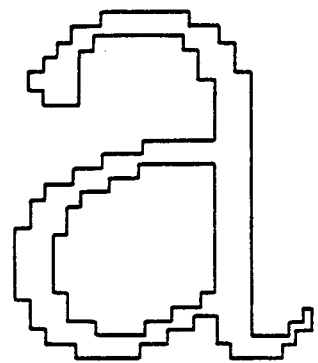
FIGS.6A through 6D are diagrams for explaining a smoothing process carried out with respect to a dot character pattern which is obtained by the present invention.
Figure 6:
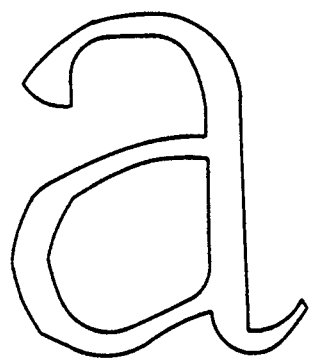
Figure 6:
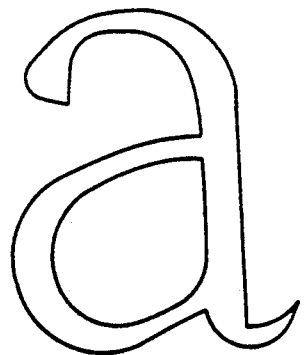
Figure 6:
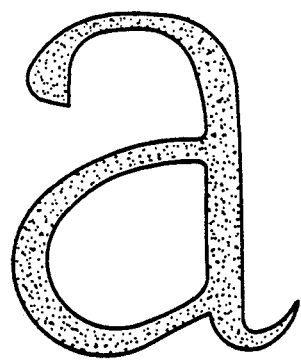

FIGS. 6A through 6D are diagrams for explaining the smoothing process of the present invention when applied to the dot character pattern "a". FIG.6A shows contour lines of an enlarged character when a character "a" described by a 48×48 dot pattern is enlarged to 15 times into the enlarged character "a" described by a 720×720 dot pattern. As is clear from FIG.6A, the contour lines of the enlarged character pattern includes conspicuous gathers when no smoothing process is carried out. The gathers in the contour lines are proportional to the magnification, and the shape and form of the enlarged character is quite deformed.

FIG.6B shows a character pattern obtained when the first smoothing process of the present invention is carried out on the enlarged character pattern shown in FIG.6A. It may be seen from FIG.6B that the gathers in the contour lines are slightly reduced by the first smoothing process.

FIG.6C shows a character pattern obtained when the second smoothing process of the present invention is carried out once on the smoothened character pattern shown in FIG.6B so as to further smoothen the contour lines of the enlarged character. It may be seen from FIG.6C that the gathers in the contour lines are substantially eliminated by the second smoothing process.

FIG.6D shows a character pattern which is obtained by carrying out a known rectilinear interpolation and a corner rounding process on the smoothened character pattern obtained by the second smoothing process and then filling the inside of the character pattern defined by the smoothened contour lines.

Further, the present invention is not limited to these embodiments, but various variations and modifications may be made without departing from the scope of the present invention.

What is claimed is:

1. A smoothing method for smoothing a contour of a dot pattern of a character, the smoothing method comprising the steps of:
   a) extracting a contour of a dot pattern of a character to be smoothed;
   b) smoothing the contour of the dot pattern by the substeps of:
      1) extracting corner points of interest along the contour of the dot pattern; and
      2) determining a curve point for each corner point of interest, based on (i) a direction and (ii) a distance, of each corner point of interest from previous and succeeding corner points, the curve points constituting a smoothed contour of the character, the curve point disposed on the corner point of interest or between the corner point of interest and an adjacent corner point in a scanning direction by which the dot pattern was formed; and
   c) carrying out a rectilinear interpolation and a corner rounding process on the smoothed contour.

2. The smoothing method as claimed in claim 1, wherein the dot pattern of the character to be smoothened has been subjected to an enlarging or reducing process.

3. A smoothing apparatus for smoothing a contour of a dot pattern of a character, the smoothing apparatus comprising:
   a) contour extracting means for extracting a contour of a dot pattern of a character;
   b) smoothing means for smoothing the contour of the extracted dot pattern by
      1) extracting corner points of interest along the contour of the dot pattern; and
      2) determining a curve point for each corner point of interest, based on (i) a direction and (ii) a distance, of each corner point of interest from previous and succeeding corner points, the curve points constituting a smoothed contour of the character, the curve point disposed on the corner point of interest or between the corner point of interest and an adjacent corner point in a scanning direction by which the dot pattern was formed;
   c) processing means for carrying out a rectilinear interpolation and a corner rounding process on the smoothed contour; and
   d) control means for controlling the contour extracting means, smoothing means, and processing means.

4. The smoothing apparatus as claimed in claim 3, wherein said contour extracting means receives the dot pattern of the character to be smoothened which has been subjected to an enlarging or reducing process.

* * * * *